United States Patent

[11] 3,552,264

| [72] | Inventor | Wilbur E. Meinke |
| | | Scotch Plains, N.J. |
| [21] | Appl. No. | 794,739 |
| [22] | Filed | Jan. 28, 1969 |
| | | Division of Ser. No. 564,122, July 11, 1966, Pat. No. 3,455,610. |
| [45] | Patented | Jan. 5, 1971 |
| [73] | Assignee | The New Britain Machine Company |
| | | New Britain, Conn. |
| | | a corporation of Connecticut |

[54] MACHINE TOOL
9 Claims, 15 Drawing Figs.

[52] U.S. Cl. ................................................. 90/11, 90/14, 90/16, 77/24
[51] Int. Cl. .................................................. B23c 1/08, B23b 39/16
[50] Field of Search ......................................... 90/14, 11.1, 16, 15, 11; 77/24

[56] References Cited
UNITED STATES PATENTS
| 1,083,696 | 1/1914 | Nelson .................... | 77/24 |
| 1,148,094 | 7/1915 | Kern, Jr. ................. | 77/24 |
| 1,470,735 | 10/1923 | Hey et al. ............... | 77/24 |

Primary Examiner—Gil Weidenfeld
Attorneys—Daniel S. Urey, Alan C. Rose and Alfred B. Levine ABSTRACT: A machine tool having a spindle head saddle horizontally movable along a rail, a spindle head connected to the saddle for vertical movement, a plurality of vertically adjustable spindle assemblies carried by the spindle head each including a tool spindle having a driven gear connected thereto, a plurality of driven shafts corresponding in number to the spindle assemblies, journaled in the spindle head adjacent to the spindle assemblies and each having a driving gear connected thereto and engageable with the driven gear connected to the spindle of the adjacent spindle assembly, power means operatively connected to the shafts for rotating said shafts and said tool spindles, and means including eccentrically mounted members carried by the saddle and the spindle head and engageable with ways on the rail and saddle for adjusting the saddle and spindle head relative to their supporting members.

MACHINE TOOL

RELATED CASES

This application is a division of copending application, Ser. No. 564,122, filed Jul. 11, 1966, now U.S. Pat. No. 3,455,610, entitled "Machine Tool." The subject matter of the aforesaid application is incorporated herein by reference.

FIELD OF INVENTION

The present invention relates to machine tools, and more particularly to machine tools having movable machine tool members or elements, such as a rotatable tool spindle, a reciprocable worktable, etc. supported for rotation and/or reciprocal movement relative to their supports.

The accuracy of various machining operations performed by machine tools of the type referred to is dependent upon the manner in which the movable member or members are supported, the ease by which they can be moved, and the accuracy of their movements, especially during feeding movements. The accuracy of the movement and/or positioning of the movable member is largely dependent upon the nonflexibility or rigidity of the support and/or drive therefore and the accuracy with which it is guided in its movements relative to its supporting member.

The accuracy of a machining operation performed by a tool carried by a rotating spindle depends at least to some extent upon the length of the tool spindle, the manner in which it is driven, and its extension relative to its supporting bearings, etc. The amount of torsion or twisting of the tool spindle having a tool attached to one end and rotatable by a drive connection spaced from the tool depends upon the length of the spindle between its tool supporting end and the drive connection, and such torsion should be minimized to enhance machining accuracy.

SUMMARY OF INVENTION

This invention provides a new and improved machine tool having a movable member supported by a bearing and guide arrangement of a practical, simple, and economical construction and which is effective to support and accurately guide the movable member with a minimum amount of friction engagement therebetween.

This invention further provides a new and improved machine tool having a movable member supported by an arrangement including a pair of opposed guide surfaces thereon or on the supporting member and a plurality of guide rollers carried by other of the members at spaced locations therealong in rolling engagement with the guide surfaces, and wherein the rollers are adjustably positionable toward and from the guide surfaces so that the movable member can be rapidly and readily aligned with respect to the support member.

This invention further provides a new and improved machine tool having a movable tool spindle head provided with a plurality of spindle assemblies each including a rotatable tool spindle, a plurality of drive shafts parallel with and adjacent to the tool spindle, and gearing connecting the adjacent spindles and drive shafts whereby the distance between the connection of the drive to the spindles and the tools carried thereby can be reduced.

This invention further provides a new and improved machine tool including a movable tool spindle head, a plurality of spindle assemblies carried by the spindle head, each spindle assembly including a housing and a spindle rotatable therein, adjustment means connecting each of the spindle assemblies to the spindle head for individual movement relative thereto, and a drive assembly for rotating the spindles.

This invention further provides a new and improved machine tool having a movable tool spindle head, a plurality of tool spindle assemblies carried by the head, each including a housing and a tool spindle rotatable therein, adjustment means connecting each of the spindle assembly housings to the head for individual movement relative thereto, and a drive assembly arranged and constructed to minimize the distance between the tools and the drive connection to the spindles and in turn the torsion of the spindle, the spindle drive assembly including a plurality of shafts journaled for rotation in the head along side of the tool spindle and drivingly connected to the tool spindles, and power drive means for rotating the shafts.

This invention further provides a new and improved machine tool having a movable tool spindle head, a plurality of spindle assemblies carried by the head, each spindle assembly including a housing and a tool spindle rotatable therein, adjustment means connecting each of the spindle assembly housings in laterally spaced relation to an outer face of the tool spindle head for individual movement relative thereto, and a spindle drive assembly including a plurality of shafts adjacent the tool spindles journaled for rotation in the head and drivingly connected to the spindles by gears connected to the spindles adjacent to their front bearings in mesh with gears connected to the shafts, one of which gears of each gear connection being a wide face gear whereby the spindle housings can be individually adjusted while maintaining driving engagement between the shafts and the spindles, and power-actuated drive means for rotating the shafts.

DESCRIPTION

This invention resides in certain novel constructions and arrangement of parts, and further advantages will appear from the following description of the preferred embodiment described with reference to the accompanying drawings, which form a part of this specification and in which like reference characters designate corresponding parts throughout the several views, and wherein.

Figure 1:
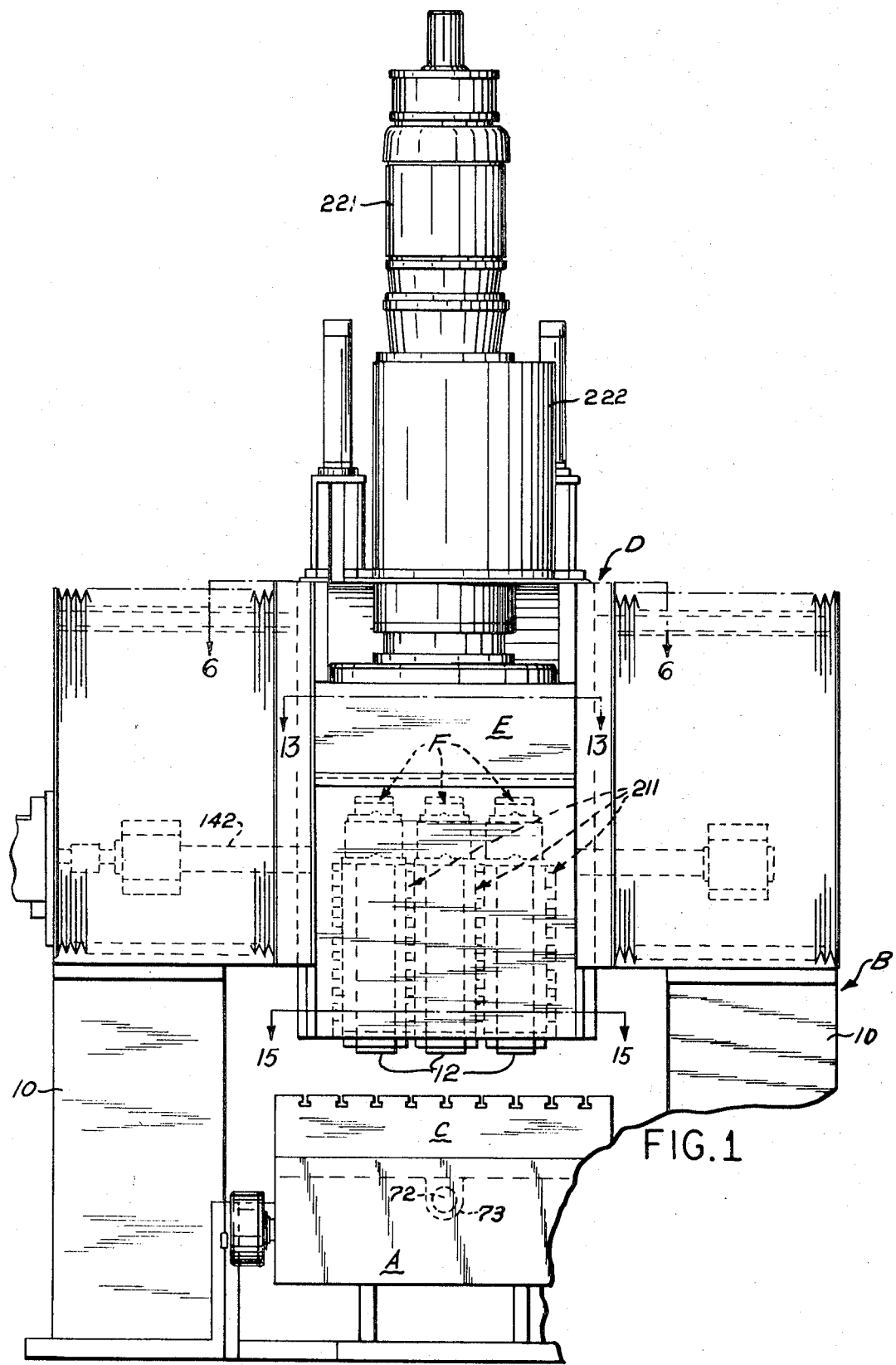
FIG. 1 is a fragmentary front elevational view of a multiple spindle vertical milling machine embodying the present invention.

The present invention is susceptible of being embodied in various kinds or types of machine tools, and for the purposes of illustration are herein shown and described as embodied in a vertical milling machine.

The vertical milling machine shown comprises an elongated bed A, a saddle support B including a pair of horizontally spaced vertically extending rail support columns 10 at opposite sides of the bed A, and a horizontally disposed rail 11 supported by the columns 10 in spaced relation above the bed A. The bed A slidably supports a work support or table C for horizontal linear movement in opposite directions longitudinally thereof. The rail 11 slidably supports a saddle D for horizontal linear movement in opposite directions relative thereto and transversely to the direction of movement of the table C. The saddle D slidably supports a spindle head E for vertical linear movement in opposite directions relative thereto toward and from the bed A. The spindle head E slidably supports a plurality of, preferably three, spindle assemblies F for vertical movement relative thereto. The spindle assemblies F are individually movable independently of one another and each is provided with a tool spindle 12 to which a suitable tool can be attached for performing a machining operation on a workpiece or workpieces (not shown) carried by the table C.

The bed A is a fabricated assembly which includes a pair of laterally spaced hardened steel support or way members 14 and 16 extending longitudinally of the bed and parallel to one another bolted to the top side of raised support portions 18 and 20 on the bed A. The support members 14 and 16 overhang or extend laterally beyond the outer longitudinally extending sides of the raised portions 18 and 20 and are provided with longitudinally extending, upwardly and downwardly facing ways 21 and 22 and 23 and 24, respectively. The upwardly facing way 21 is a planar surface in the member 14 and the upwardly facing way 23 is a V-shaped groove in the upper side of the member 16 with the opposed sides of the groove having a 90° included angle. The downwardly facing ways 22 and 24 are planar surfaces on the under sides of the members 14 and 16, respectively.

The upwardly facing ways 21 and 23, respectively, carry a plurality of roller bearings 30 and 31 at spaced locations longitudinally therealong and which extend upwardly therefrom. The roller bearings 30 are here shown as cylindrical rollers having their longitudinal axes 32 extending perpendicularly to the length of the way 21 and their bottom side surfaces in engagement therewith. The cylindrical rollers 30 are supported for rotation about their longitudinal axes on the way 21 and are retained at equally spaced locations along the way 21 by a suitable retainer or cage assembly 33 disposed within a recessed portion 34 of the upper side of the support member 14 and having longitudinally spaced crossmembers defining longitudinally spaced openings in which the rollers 30 are received. The bearings 31 carried by the V-shaped way 23 are here shown as right cylindrical rollers having a length equal or substantially equal to their diameters. The cylindrical rollers 31 are disposed such that their side surfaces engage one of the sides of the way 23 and one of their ends engage the other side of the way 23.

Figure 4:
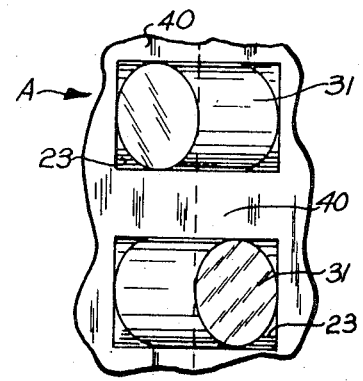
FIG. 4 is an enlarged fragmentary plan view of part of the machine shown in FIG. 3.
Figure 10:
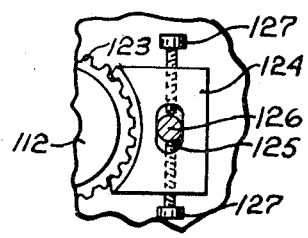
FIG. 10 is a fragmentary sectional view taken approximately along line 10-10 of FIG. 9.

As best shown in FIG. 4, the cylindrical rollers 31 are arranged in a staggered relation, that is, the longitudinal axes 39 of adjacent rollers 31 extend at right angles with each other and the longitudinal axes 39 of alternate ones of the rollers 31 extend parallel to each other. The rollers 31 are retained at equally spaced locations along the way 23 by spacer members 40 disposed between adjacent ones thereof. The spacer members 40 have parallel sides so as to allow the rollers 31 to freely rotate about their longitudinal axes 39.

Figure 3:
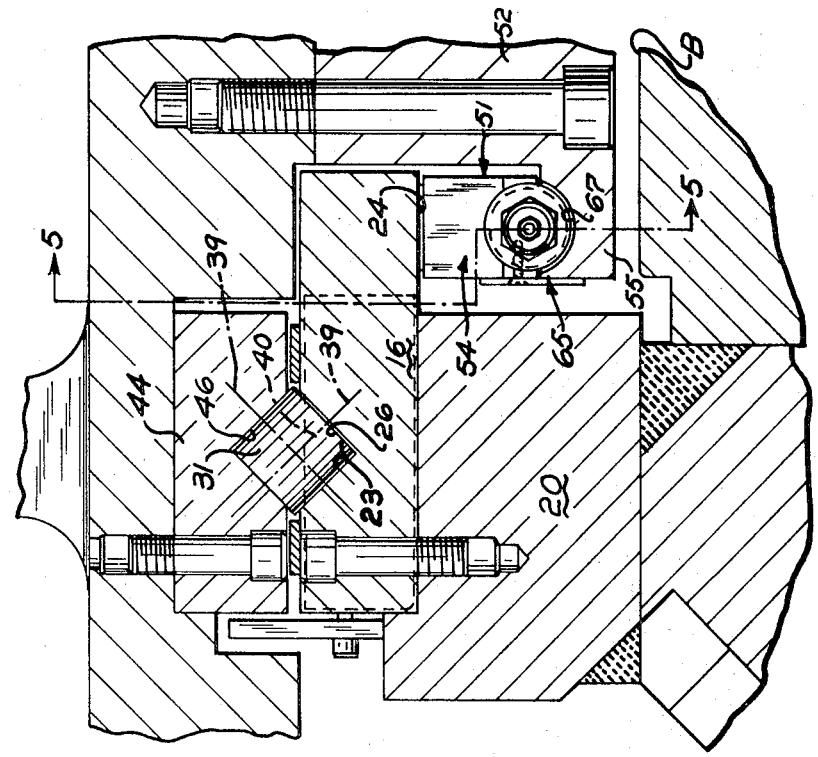
FIG. 3 is an enlarged fragmentary sectional view taken approximately along line 3-3 of FIG. 2.
Figure 3:
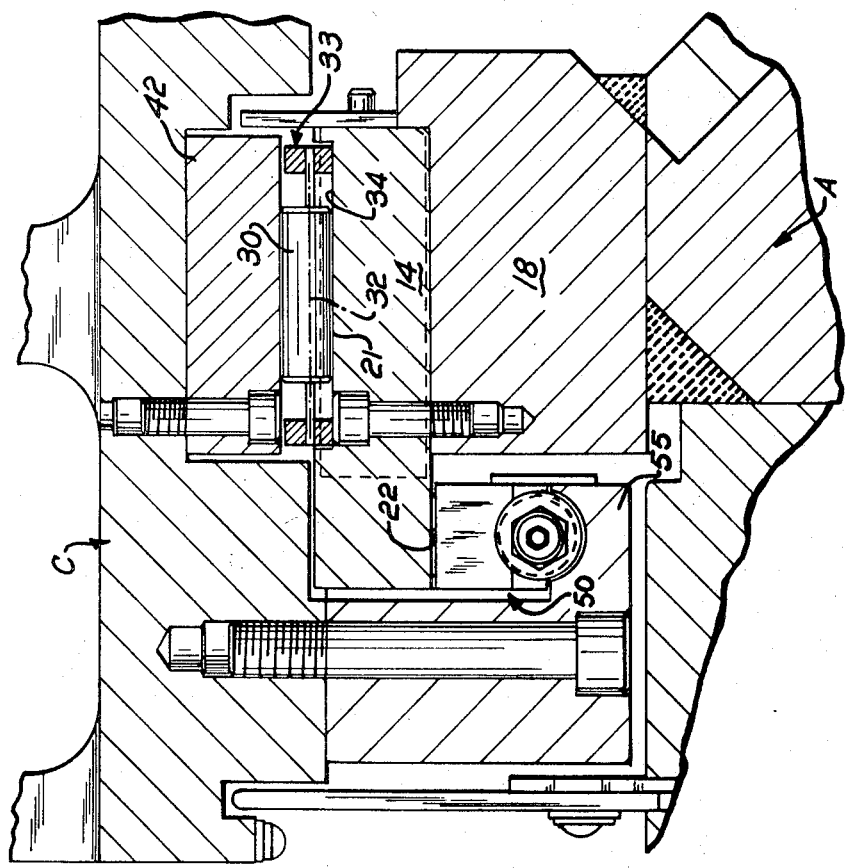

The table C is supported adjacent its left and right sides, as viewed in FIG. 3, and in spaced relation with respect to the ways 21 and 23 by the roller bearings 30 and 31. To this end, the table C adjacent its left side has a longitudinally extending, hardened steel support or way member 42 bolted to its underside and which engages the upper side surfaces of the rollers 30 carried by the upwardly facing way 21. The table C adjacent its right side has a longitudinally extending, hardened steel support or way member 44 bolted to its underside. The support member 44 has a V-shaped recess or way 46 whose intersecting sides form a 90° included angle with each side, engaging the upper side and end surfaces of the rollers 31 carried by the upwardly facing way 23.

From the foregoing, it should be apparent that when the table C is moved relative to bed A along the ways 21 and 23, it will roll on the rollers 30 and 31, since the latter are free to rotate about their longitudinal axes. This bearing support arrangement for the table C minimizes frictional resistance to movement of the table since engagement between the table C and the side surfaces of the rollers 30 and 31 is essentially a line contact. It should also be apparent that the construction and arrangement of the V-shaped ways 23 and 46 and the roller bearings 31 also accurately guides the movement of the table C along the ways 21 and 23 by preventing movement of the table C transversely of the way 23.

To prevent the table C from deflecting or tilting relative to the bed A, the table is provided with a plurality of way engaging assemblies 50 and 51 along its left and right sides and which respectively engage the downwardly facing ways 22 and 24 at longitudinally spaced locations therealong. Since both way engaging assemblies 50 and 51 are of an identical construction, only the way engaging assembly 51 for engaging the downwardly facing way 24 on the bed A will be described in detail.

The way engaging assemblies 51 each comprise a bracket member 52 bolted or otherwise fixed to the underside of the table C, and a pair of spaced roller bearing subassemblies 53 and 54 supported by the bracket 52. The bracket 52 is generally L-shaped in cross section and has a support portion 55 disposed directly beneath but spaced from the way 24. The support portion 55 extends longitudinally of the way 24 and has upper planar surfaces 56 and 57, see FIG. 5, which are linearly tapered in opposite longitudinal directions proceeding from their inner ends toward their left and right ends. The linear taper of the upper surfaces 56 and 57 is such that they diverge from the way 24 proceeding from their inner ends toward their left and right ends.

Figure 5:
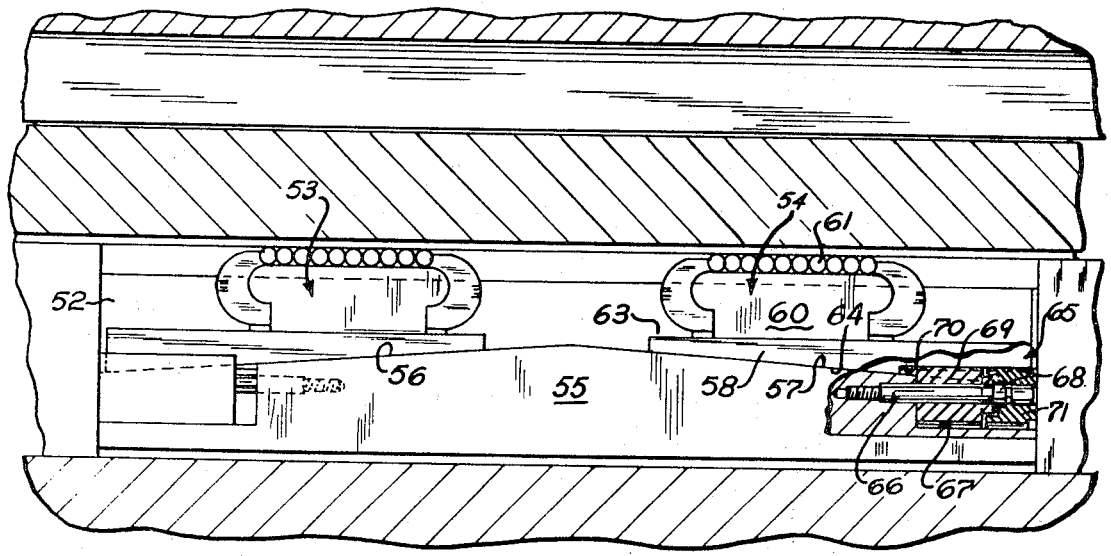
FIG. 5 is an enlarged fragmentary sectional view taken approximately along line 5-5 of FIG. 3.

The roller bearing subassemblies 53 and 54 are of an identical construction, and therefore, only the rightmost roller bearing subassembly 54, as viewed in FIG. 5, will be described in detail. The roller bearing subassembly comprises a gib 58 and a bearing means 60 mounted on the gib 58. The bearing means 60 can be of any suitable or conventional construction, but preferably comprises a housing having a plurality of rollers 61 which move in an endless path in the housing and which rollingly engage the downwardly facing way 24, and can be of the type shown in U.S. Pat. No. 3,003,828 or manufactured by Scully Jones and Company, Chicago, Illinois, as shown in catalogue No. 22—62 printed Apr. 1, 1962.

The gib 58 has a flat upper surface 63 which extends parallel to the downwardly facing way 24 and a lower linearly tapered surface 64 which engages the upper surface 57 of the support portion 55 and which is linearly tapered so as to be complementary therewith. The gib 58 is adjustably positionable along the tapered upper surface 57 of the support portion 55 to adjustably position the rollers 61 of the bearing means 60 toward and from the downwardly facing way 24 by an adjusting means 65. The adjusting means 65 comprises a stud 66 carried by the support portion 55 and which extends within an upwardly facing arcuate recess 67 at the right end of the support portion 55, as viewed in FIG. 5. Rotatably supported on the stud 66 between the inner sidewall of the recess and an annular shoulder 68 on the stud 66 is an externally threaded adjusting screw 69 which is in threaded engagement with threads 70 formed on the lower side of the gib 58. From the foregoing, it should be apparent that by rotating the screw 69, the gib 58 is caused to be moved longitudinally along the tapered surface 57 on the support portion 55. To lock the gib 58 in any desired or adjusted position, a locking screw 71 rotatably supported on the stud 66 at its outer end and which is in threaded engagement with the threads 70 on the gib is provided.

The table C is adapted to be linearly moved in opposite directions relative to the bed A by a lead screw 72 (see FIG. 1) having its opposite ends rotatably supported within the bed A and which is threadably engaged with a nut 73 carried on the underside of the table C. The lead screw 72 is adapted to be rotated in opposite directions by a suitable reversible hydraulic motor operatively connected with one end thereof.

Figure 2:
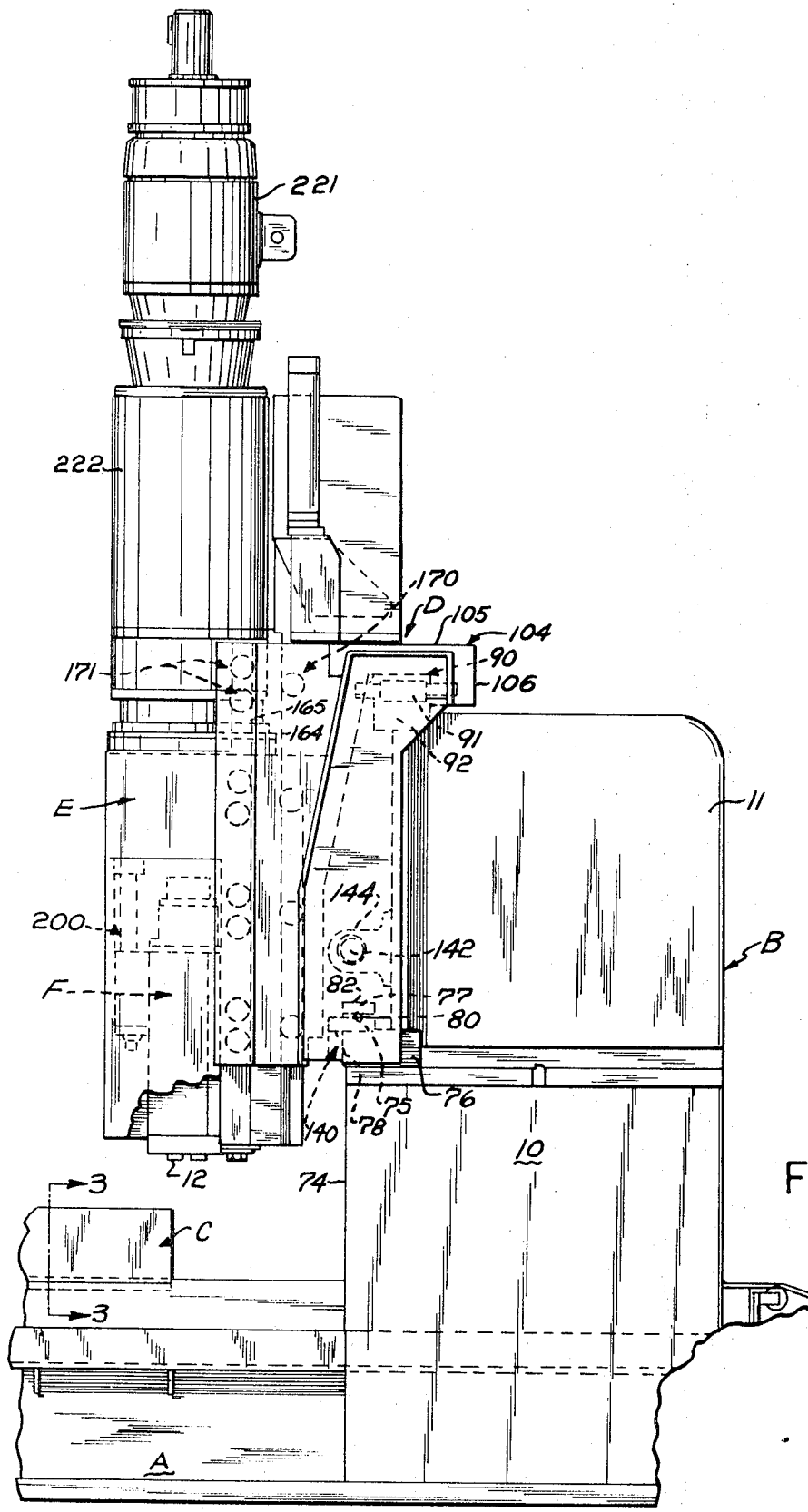
FIG. 2 is a fragmentary side elevational view of the milling machine shown in FIG. 1.

As previously mentioned, the rail 11 of the saddle support B slidably supports the saddle D for horizontal linear movement in opposite directions relative thereto and transversely of the direction of movement of the table C. As best shown in FIG. 2, the rail 11 has a front side surface 74 which is of a generally stepped configuration. Intermediate the upper and lower ends of the side 74, the rail has a horizontally disposed hardened steel support or way member 75 extending longitudinally thereof which is bolted to a raised portion 76 thereof. The support member 75 overhangs or extends laterally beyond the left side edge of the portion 76 of the rail and is provided with an upwardly facing hardened V-shaped way 77 with the sides of the V forming a right angle therebetween. The V-shaped way 77 carries a plurality of roller bearings here shown as cylindrical rollers 80, at spaced locations therealong. The cylindrical rollers 80 are of the same shape and are arranged in a staggered relation in the same manner as the rollers 31 carried by the way 23 on the bed A.

The saddle D has a horizontally extending, hardened steel support or way member 72 bolted to its underside. The support or way member 82 has a downwardly facing V-shaped way 78 whose intersecting sides form a right angle and are in engagement with the side and end surfaces of alternate ones of cylindrical rollers 80. The bearings 80 support the saddle D in spaced relation to the upwardly facing way member 75.

Figure 8:
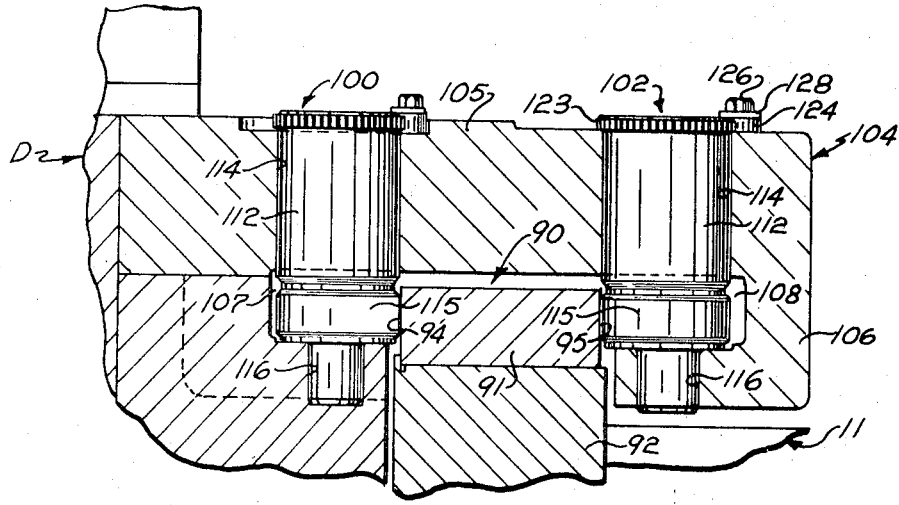
FIG. 8 is an enlarged fragmentary sectional view with portions in elevation taken approximately along line 8-8 of FIG. 6.

In accordance with one of the provisions of the present invention, the upper portion saddle D is guided as it is linearly moved relative to the rail 11 of the saddle support B by a guide arrangement 90 comprising a horizontally extending hardened steel guide or way member 91 bolted to a raised portion 92 at the upper left end of the rail 11, see FIG. 8. The member 91 has a pair of opposed vertically disposed planar ways or guide surfaces 94 and 95 on its front and rear sides, respectively, which extend longitudinally of the rail 11 and in a direction parallel to the ways 77 and 78 on the rail.

The guide arrangement 90 further comprises first and second pluralities of spaced way or guide engaging assemblies 100 and 102 for engaging the ways 94 and 95, respectively, at spaced locations therealong. The way engaging assemblies 100 and 102 are carried by a rear extension of the saddle D in the form of a bracket, generally designated by reference number 104. The bracket 104 extends lengthwise of the main body portion of the saddle D and is bolted to its right upper end, as viewed in either FIG. 2 or 8. The bracket 104 comprises a horizontally extending portion 105 and a U-shaped right end portion 106. The horizontally upper rear portion of the main body portion of the saddle D is provided with cutout portions to define a horizontally extending recess or recesses 107 opposite the recess 108 between the spaced legs of the U-shaped portion 106 of the bracket means 104.

Figure 9:
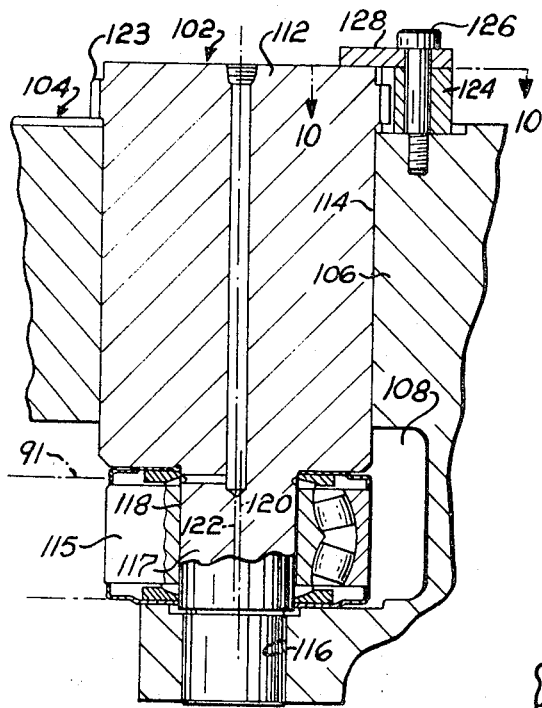
FIG. 9 is an enlarged fragmentary sectional view taken approximately along line 9-9 of FIG. 6.

Each of the way engaging assemblies 100 and 102 are of an identical construction, and therefore, only the left assembly 102, as viewed in FIG. 6, will be described in detail. Referring to FIG. 9, the way engaging assembly 102 comprises a shaft 112 having its opposite ends rotatably supported within aligned openings 114 and 116 in the legs of the U-shaped end portion 106 of the bracket 104, and a cylindrical roller 115 rotatably journaled on an intermediate portion 117 of the shaft 112, which portion 117 is located in the recess 108. The roller 115 is of a relatively large diameter or size and can be of any suitable or conventional construction, such as the rollers manufactured by SKF Industries, Philadelphia, Pennsylvania. The roller 115 is rotatably journaled or supported on an eccentric annular surface 118 of the reduced portion 117, that is, the central axis 120 of the reduced portion 117 of the shaft 112 is slightly radially spaced from the central axis of rotation 122 of the shaft 112.

The eccentric portion 117 of the shaft 112 provides a means for adjusting the roller 115 relative to the way 95 and in a direction perpendicular thereto. The roller 115 is adjusted relative to the way 95 by rotating the shaft 112 which in turn causes the eccentric portion 117 thereof to linearly move the roller 115 relative to the way 95. In order to provide for fine adjustment of the roller 115 relative to the way 95, the shaft 112 is provided with an annular gear 123 at its upper end which is in meshed engagement with a rack or gear sector 124. The gear sector 124 has a slot 125 through which a screw 126 for mounting the gear sector 124 on the bracket 104 extends. The gear sector 124 is reciprocably movable relative to the screw 126 to rotate the gear 123 and hence, the shaft 112 by adjusting a pair of opposed screws 127 which are threadably engaged with the gear sector 124 and which extend within the slot 125 and engage the screw 126 at diametral opposite locations thereon. When both adjusting screws 127 have their inner ends in engagement with the screw 126, the gear sector 124 is locked against movement relative to the screw 126 and the gear 123 and shaft 112 are locked against rotation and hence, the roller 115 is locked in its adjusted position relative to the way surface 95. The shaft 112 is retained in its operative position shown in FIG. 6 by a flat plate member 128 which overlies a portion of the upper end of the shaft 112 and the gear sector 124 and the screw 126 which extends through an aperture in the plate 128 and the slot 125 of the sector 124 and which is threadably engaged with an aligned thread opening in the bracket 104.

Figure 6:
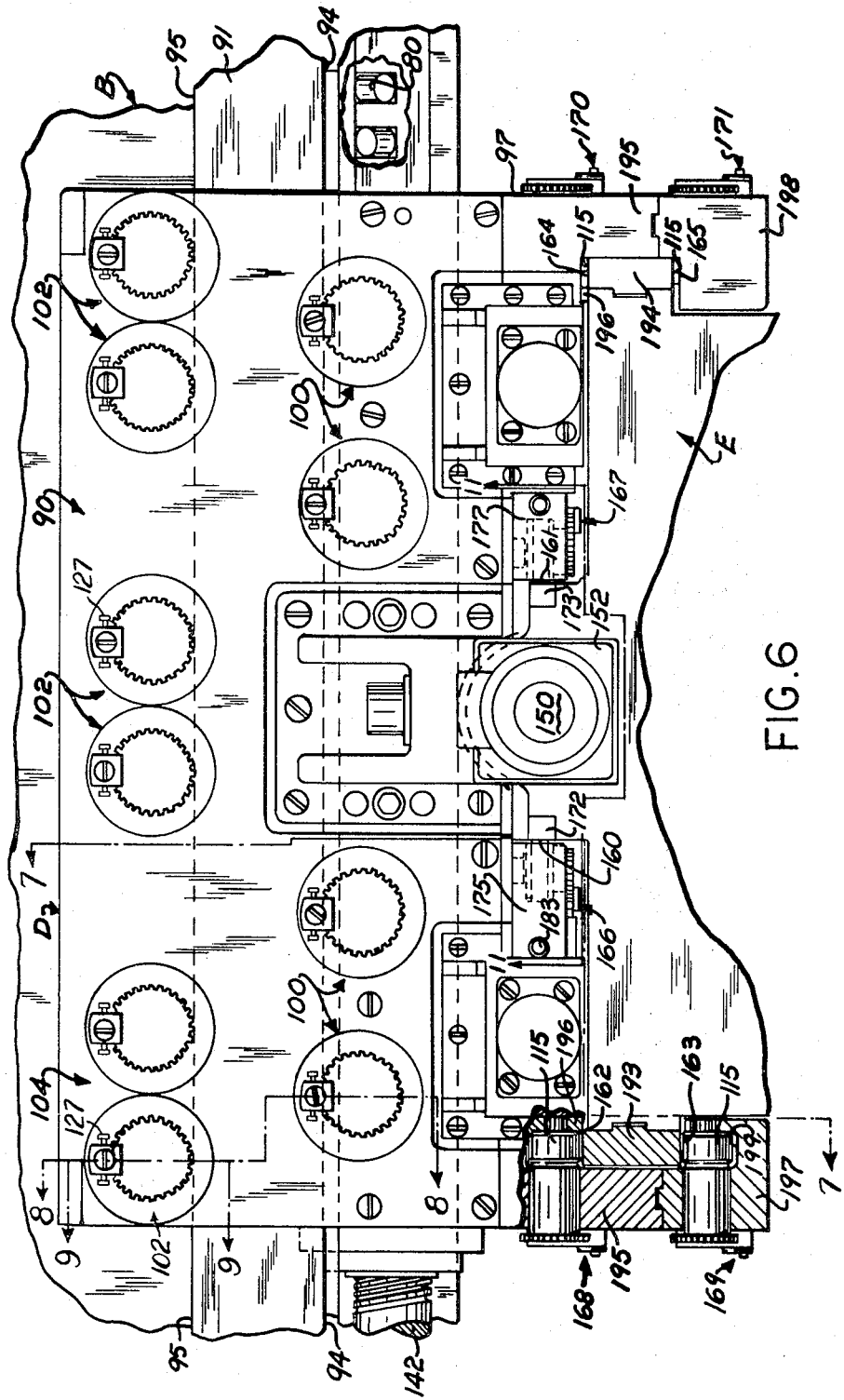
FIG. 6 is an enlarged fragmentary plan view of the machine looking in the direction of the arrow 6-6 of FIG. 1, with portions shown in section.
Figure 7:
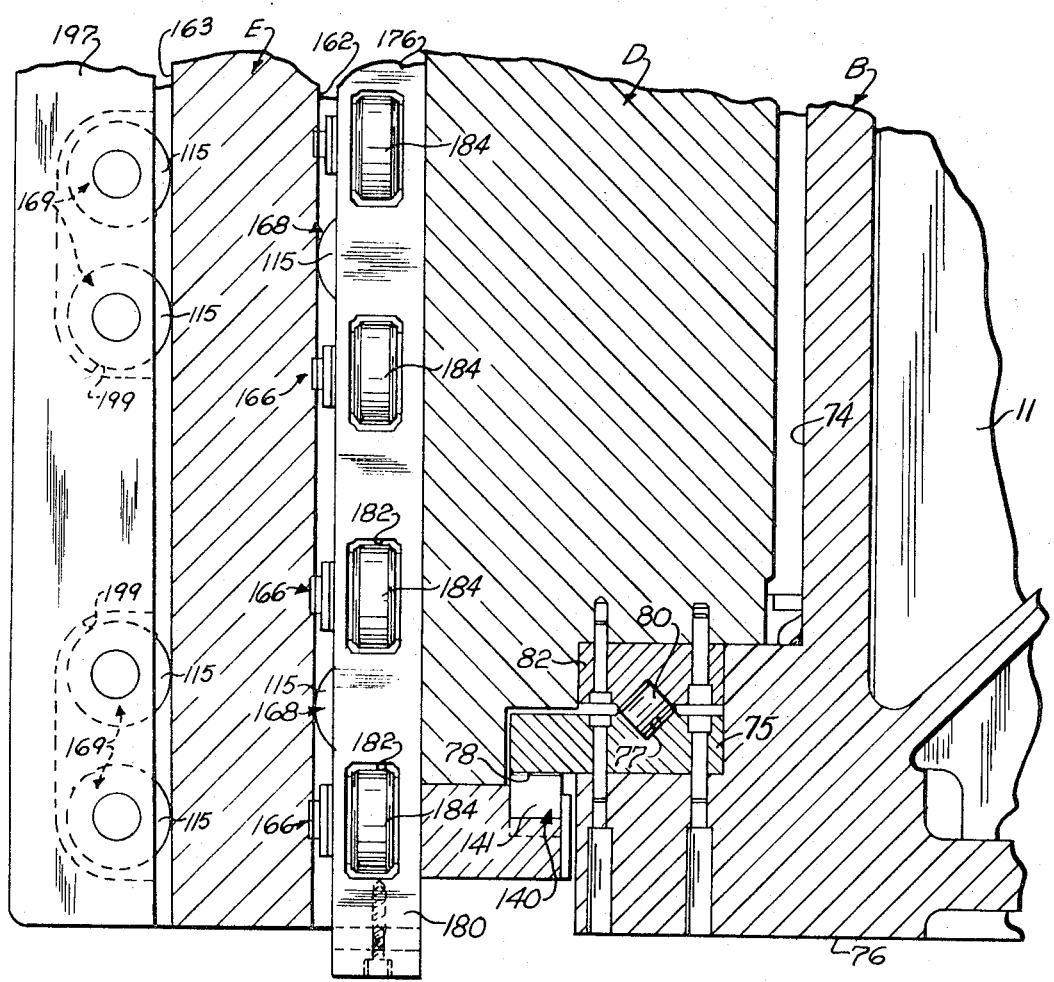
FIG. 7 is an enlarged fragmentary sectional view taken approximately along line 7-7 of FIG. 6.

As best shown in FIG. 6, the rollers 115 of the way engaging assemblies 100 and 102 rollingly engage the ways 94 and 95 at longitudinally spaced locations therealong, and that since the rollers 115 are of a large diameter and adjustably positionable toward and from the ways 94 and 95 the saddle can be accurately aligned with respect to the ways 94 and 95. The provision of the adjustable rollers 115 provides a guide arrangement which very accurately guides the movement of the saddle D and which prevents the saddle from pivoting about the cylindrical roller bearings 80.

To prevent the saddle from being moved upwardly relative to the way 77, a plurality of spaced way engaging assemblies 140 are provided for engaging the downwardly facing way 78 on the member 75. The way engaging assemblies 140 are of an identical construction to the way engaging assemblies 50 and 51 for engaging the downwardly facing ways 22 and 24 on the bed A and with their bearing means 141 being adjustably positionable toward and from the way 78 in the same manner that the bearing means 60 are adjustably positionable toward and from the ways 22 and 24.

The saddle D is adapted to be linearly moved relative to the rail 11 by a rotatable lead screw 142 having its opposite ends rotatably supported by the saddle support B and which is in threaded engagement with a nut 144 fixed to the rear side of saddle D. The lead screw 142 is adapted to be rotated in opposite directions by a suitable or conventional hydraulic motor (not shown) and which is operatively connected to the lead screw 142 at one end thereof.

The spindle head is slidably supported by the saddle D and is adapted to be moved relative to the saddle D by a lead screw 150 having its opposite ends rotatably supported by the saddle D and which is in threaded engagement with a nut 152 carried at the upper end of the spindle head E. The lead screw 150 is adapted to be rotated in opposite directions by a suitable reversible hydraulic motor (not shown) operatively connected with the upper end of the lead screw 150.

Provision is made to enable the spindle head E to be accurately aligned with respect to the saddle D and for accurately guiding its movement when moved vertically relative to the saddle D. As best shown in FIG. 6, the spindle head E is provided with opposed pairs of vertically extending guide surfaces 160 and 161, 162 and 163 and 164 and 165, and the saddle D carries opposed pluralities of guide assemblies, generally designated by reference numerals 166 and 167 and 168 and 169 and 170 and 171 for respectively engaging the opposed pairs of guide surfaces on the spindle head E at spaced vertical locations therealong to guide the movement of the latter. The guide surfaces 160 and 161 are planar and are formed on the left and right sides of vertically extending hardened steel guide or way members 172 and 173 bolted to the left and right sides of a rearwardly extending portion 172 located intermediate the left and right sides of the spindle head E, respectively.

Figure 11:
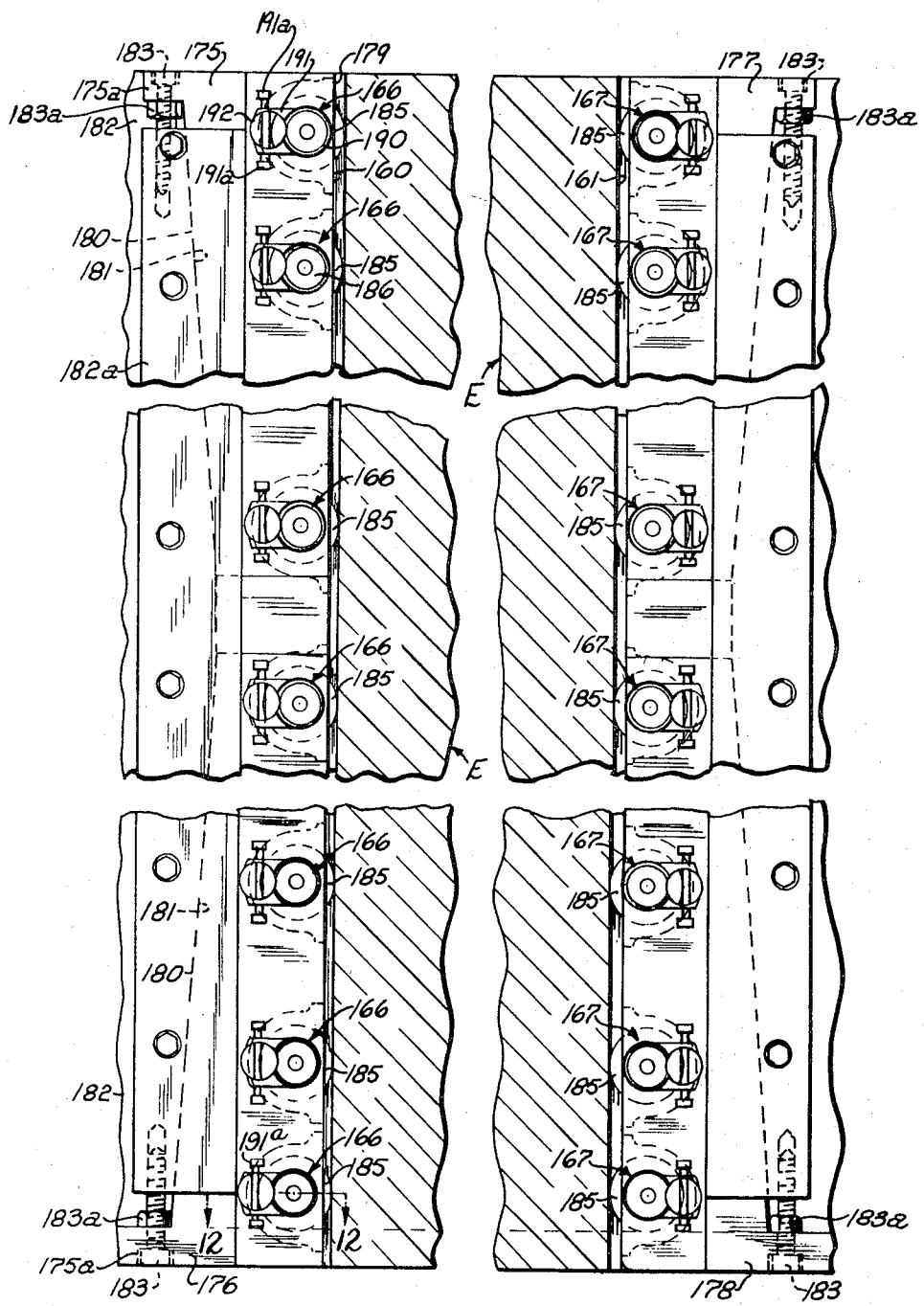
FIG. 11 is an enlarged fragmentary sectional view with portions in elevation taken approximately along line 11-11 of FIG. 6.
Figure 13:
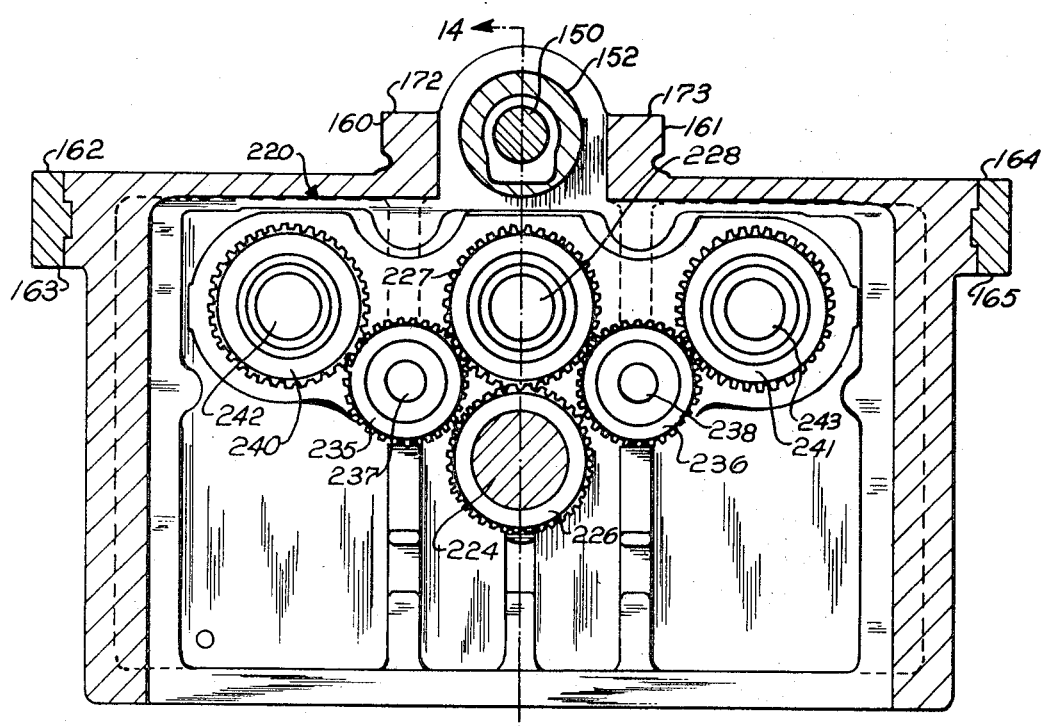
FIG. 13 is an enlarged fragmentary sectional view taken approximately along line 13-13 of FIG. 1.

As best shown in FIG. 11, the upper and lower ones of the opposed plurality of spaced guide assemblies 166 and 167 for engaging the side guides 160 and 161 are respectively carried by vertically extending gibs 175 and 176 and 177 and 178 slidably supported by the saddle D adjacent the guides 160 and 161. The gibs 175, 176, 177 and 178 are of an identical construction and each is supported by the saddle D in the same manner and therefore only the gib 175 and the manner in which it is supported by the saddle D will be described in detail, and corresponding parts will be given the same reference numerals on the drawings. The gib 175 has a forward planar surface 179 extending parallel to the guide surface 160 and a rearward surface 180 which is linearly tapered and converges toward the guide surface 160. The rearward surface 180 is slidably engaged with a complementary linearly tapered surface 181 on a vertically extending support portion 182 formed integral with the saddle D.

The gib 175 is adjustably positionable in a vertical direction along the surface 181 of the support portion 182 to simultaneously adjustably position all of the guide assemblies 166 carried by the gib 175 relative to the guide surface 160 by an adjustment means comprising a cap screw 183 and a nut 183a. The cap screw 183 extends through an opening in a flange 175a integral with the gib 175 at its upper end and is threadably received in an aligned threaded opening in the support portion 182. The flange 175a is disposed above the upper end of the support portion 182 and the nut 183a, which is carried between the flange 175a and the support portion 182, is adapted to be moved into engagement with the underside of the flange 175a to hold the latter in abutting engagement with the head of the screw 183 to prevent relative movement between the gib 175 and the support portion 182. From the foregoing, it should be apparent that by adjusting the screw 183 and the nut 183a, the gib 175 can be vertically moved relative to the support portion 182, which movement in turn causes the upper ones of the guide assemblies 166 to be moved relative to the guide surface 160 in a direction perpendicular thereto due to the complementary tapered surfaces 180 and 181. Movement of the gib 175 in a vertical direction is guided by the front face of the saddle D and a vertically extending member 182a bolted to the support portion 182.

The lower gib 176 is adjustably positionable in the same manner that the gib 175 is adjustably positionable except that the head of the cap screw 183 abuts the flange 175a of the gib 176 and extends through an opening therein and is threadably received in an aligned threaded opening in the lower end of the support portion 182. Each of the gibs is provided with vertically spaced recesses 184, facing toward the opposed guides 160 and 161 and in which relatively large diameter rollers 185 of the guide engaging assemblies 166 and 167 are disposed.

Figure 12:
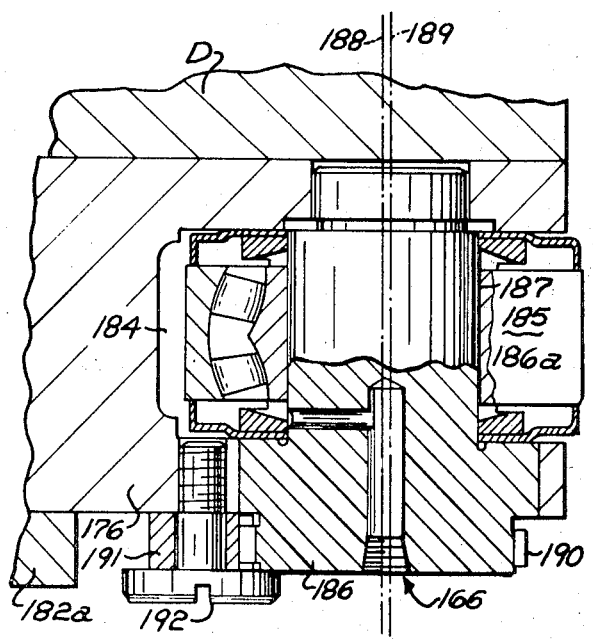
FIG. 12 is an enlarged fragmentary sectional view taken approximately along line 12-12 of FIG. 11.

The guide engaging assemblies 166 and 167 are each of an identical construction and are respectively rotatably supported by the gibs in the same manner, and therefore only the left lowermost guide assembly 166, as viewed in FIG. 11, and the manner in which it is supported by the gib 176 will be described in detail. As best shown in FIG. 12, the guide engaging assembly 166 comprises a shaft 186 having its opposite ends rotatably supported within aligned openings in the portions of the gib 176 forming the opposite sides of the recess 184. The cylindrical roller 185 is rotatably journaled on an intermediate portion 186a of the shaft 186, which portion 186a is located in the recess 184. The roller 185 is rotatably journaled or supported on an eccentric annular surface 187 of the reduced shaft portion 186a, that is, the central axis 188 of the reduced portion 186a of the shaft 186 is slightly radially spaced from the central axis of rotation 189 of the shaft 186.

The eccentric portion 187 of the shaft 186 provides a means for adjusting the roller 185 relative to the forward planar surface 178 of the gib 176 and/or the guide 160 and in a direction perpendicular thereto. The roller 185 is adjusted relative to the gib 176 by rotating the shaft 186 which in turn causes the concentric portion 187 thereof to linearly move the roller 185 relative to the surface 178 of the gib 176. In order to provide for fine adjustment of the roller 185 relative to the surface 178 of the gib 176 and/or way 95, the shaft 186 is provided with an annular gear 190 at its lower end, as viewed in FIG. 12, which is in meshed engagement with a rack or gear sector 191. The rack 191 is of the same construction as the rack 124 of the way engaging assembly 102, and is reciprocably movable by adjusting a pair of opposed adjusting screws 191a whose inner ends cooperably engaging a screw 192 extending through the rack to rotate the gear 190 on the shaft 186 and in the same manner as that previously described in connection with the way engaging assembly 102. When the shaft 186 has been rotated to position the roller 185 relative to the surface 178, it can be locked in that position by the adjusting screws 191a. The screw 192 has a head portion which overlies a portion of the lower end of the shaft 186 and the gear sector 191 and a threaded shank which extends through an aperture in the gear sector 191 and is threadably engaged in an aligned threaded opening in the gib 176. By loosening the screw 192 the gear sector 191 can be reciprocated by adjusting the screws 191a to rotate the shaft 186, and by drawing the screw 192 down tightly against the gear sector 191, the latter clampingly engages the lower end of the shaft 186, as viewed in FIG. 12, to retain the latter in its operative position relative to the gib.

The provision of the tapered gibs 175, 176, 177 and 178 carrying a plurality of way engaging assemblies enables a plurality of the way engaging assemblies to be simultaneously adjustably positioned relative to the adjacent guide surface on the spindle head E by merely adjustably positioning the gib along the tapered surface of the support portion 180 and thus, enables the spindle head E to be rapidly aligned with respect to the saddle D.

Referring to FIG. 6, the opposed guide surfaces 162 and 163 and 164 and 165 are the planar rearwardly and forwardly facing sides of the vertically extending hardened steel members 193 and 194 bolted to the left and right sides of laterally projecting portions and at the rearward side of the spindle head E, respectively, and which extend perpendicular to the guide surfaces 160 and 161. The opposed plurality of spaced guide assemblies 168 and 169 and 170 and 171 for respectively engaging the ways or guides 162 and 163 and 164 and 165 at spaced vertical locations therealong are each of an identical construction to the guide assemblies 102 shown in FIG. 9 and corresponding parts thereof have been given the same reference numerals. The guide assemblies 168 and 170 are supported at vertically spaced locations by a pair of vertically extending support portions 195 and 196 projecting forwardly of and formed integral with the saddle D at its left and right ends of the saddle D, as viewed in FIG. 6. The guide assemblies 169 and 170 are rotatably supported by the support portions 195 and 196 for rotation about horizontal axes and in the same manner that the guide assemblies 102 are supported between the spaced legs of the U-shaped end portion 106 of the bracket 104. The plurality of spaced guide assemblies 169 and 171 for respectively engaging the forwardly facing guides 163 and 165 at spaced vertical locations therealong are rotatably supported at spaced vertical locations by vertically extending support members or brackets 197 and 198 fixed to the projecting portions 195 of the saddle D. The members 197 and 198 have vertically spaced recesses 199 therein in which the rollers 115 of the guide assemblies 169 and 171 are disposed and the guide assemblies 169 and 171 are supported for rotation by the support members 197 and 198 about horizontal axes in the same manner that the guide assemblies 102 are rotatably supported by the bracket 104. Alternately, the upper and lower ones of the vertically spaced guide assemblies 168, 169, 170 and 171 could be supported by adjustably positionable tapered gibs and in the same manner that the guide assemblies 165 and 166 are supported by tapered gibs.

From the foregoing, it should be apparent that the spindle head E can be accurately aligned for vertical movement with respect to the saddle D by suitably adjusting the guide assemblies and that it is accurately guided for vertical movement relative to the saddle D and with only a minimal amount of frictional engagement therebetween.

Figure 14:
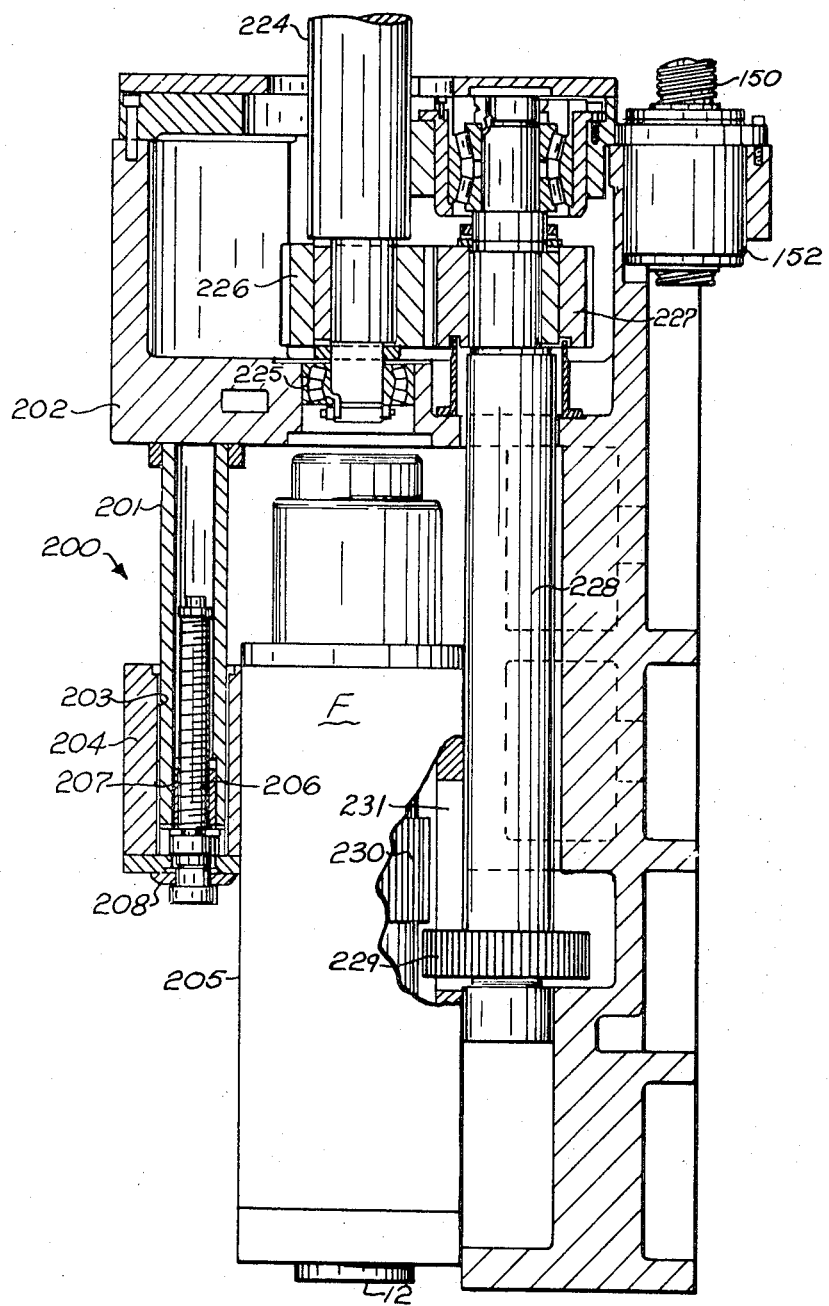
FIG. 14 is an enlarged fragmentary sectional view taken approximately along line 14-14 of FIG. 13.

As previously mentioned, the spindle assemblies F are supported by the spindle head E for vertical linear movement relative thereto. As best shown in FIG. 14, each of the spindle assemblies F is supported by an adjustable support means 200 which comprises a vertically disposed hollow member 201 having one end fixed or secured to the underside of a forwardly projecting portion 202 at the upper end of spindle head E and the other end slidably received within an opening 203 in a support member 204 welded or otherwise secured to the forwardly facing side of a housing 205 of the spindle assembly F. The support member 204 carries a vertically disposed screw 206 which projects upwardly into the hollow member 201 and is in threaded engagement with a nut 207 fixed within the lower end of the hollow member 201. The screw 206 projects downwardly from the support member 204 and has a dial 208 fixed to its lower end. The spindle assembly F can be adjustably positioned vertically relative to the spindle head E by suitably rotating the screw 206.

Figure 15:
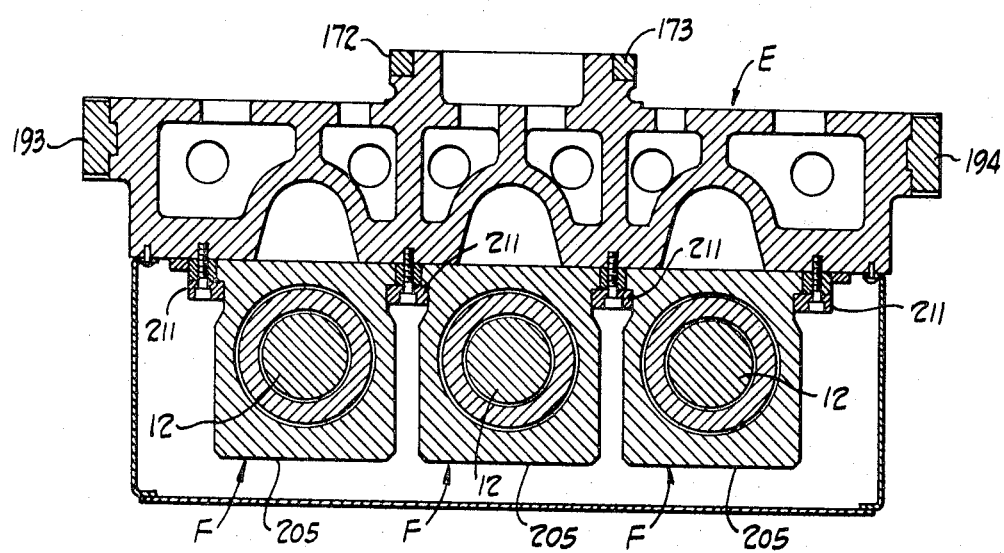
FIG. 15 is an enlarged fragmentary sectional view taken approximately along line 15-15 of FIG. 1.

The spindle assemblies F are vertically movable along vertically extending ways or guides 211 (see FIGS. 1 and 15) secured to the front side of the spindle head E at laterally spaced locations thereon. The lateral spacing between the spindle assembly housings 205 and the arrangement of the housings on the outside front face of the head E improves the cooling of the spindle assemblies.

The spindle assemblies F can be of any suitable or conventional construction and since they do not per se form a part of the present invention, they will not be described in detail and only those features which are necessary for a complete understanding of the operation of the milling machine will be hereinafter described.

The tool spindles 12 of each of the spindle assemblies F are adapted to be rotated at various rates of speed by a drive assembly, designated generally by reference numeral 220. The drive assembly 220 comprises a reversible electric motor 221 operatively connected with a change speed planetary gear transmission 222. Any suitable or conventional change speed gear transmission can be employed. The change speed gear transmission 222 has an output shaft 224 the lower end of which is rotatably journaled in a bearing means 225 carried in the spindle head E and has fixed adjacent thereto a spur gear 226 which is in constant mesh with a spur gear 227 fixed to a vertically disposed shaft 228 having its opposite ends rotatably journaled in the spindle head E. The shaft 228 adjacent its lower end has a spur gear 229 fixed thereto which is adapted to be meshingly engaged with a wide-faced gear 230 fixed to the tool spindle 12 of the middle spindle assembly F intermediate its ends. The housing 205 of the spindle assembly F has a suitable vertically extending slot or opening 231 therein through which the gear 229 projects.

The gear 227 is also in constant mesh with the pair of idler gears 235 and 236 respectively fixed to a pair of shafts 237 and 238 having their opposite ends rotatably journaled in an upper portion of the spindle head E. The idler gears 235 and 236 are in constant mesh with spur gears 240 and 241, respectively, fixed to vertically disposed shafts 242 and 243 adjacent their upper ends. The shafts 242 and 243 are rotatably journaled at their opposite ends in the spindle head E and carry spur gears (not shown) fixed thereto adjacent their lower end. These latter gears are adapted to meshingly engage wide-faced gears (not shown) fixed to the tool spindles 12 of the left and right spindle assemblies F, as viewed in FIG. 1. The drive assembly including the vertically disposed shafts 228, 242 and 243 which are drivingly connected to the spindles F near their lower tool supporting ends minimizes the length of the spindles and the resulting torsion thereof when the spindles are rotatably driven.

The provision of the wide-faced gears 230 on the spindles 12 of spindle assemblies F and the slots 231 enable the spindle assemblies to be adjustably positioned vertically relative to a spindle head E a predetermined distance while maintaining a driving connection therebetween. Provision is also made, however, to enable the wide-faced gears 230 to be disengaged from the gears 229 to disconnect the driving connection between the drive means and spindle 10. To this end, the linear adjustment provided by the screws 206 is greater than the linear or axial extent of the wide-faced gears 230 so that the spindle assemblies F can be moved upwardly to the position shown in FIG. 14 in which the wide-faced gears 230 are disengaged from the gears 229 of the drive means.

From the foregoing description of the illustrated embodiment of the present invention it will be apparent that the objects heretofore enumerated and others have been accomplished and that a new and improved machine tool has been provided which is capable of performing extremely accurate machining operations, and which comprises a plurality of spindle assemblies, each of which is individually adjustable in opposite directions relative to a tool spindle head, and a drive assembly which minimizes the distance between the tools and the drive connections to the tool spindles and the resulting torsion thereof during rotation of the spindles.

Although the machine tool of the present invention has been illustrated and described herein to a somewhat detailed extent, it will be understood, of course, that the invention is not to be regarded as being limited correspondingly in scope but includes all changes and modifications coming within the terms of the claims hereof.

I claim:

1. In a machine tool, a support member, a spindle head, means connecting said spindle head to said support member for linear movement in opposite directions relative thereto, said spindle head connecting means including eccentrically mounted members carried by said spindle head and engageable with opposed ways on said support member for adjusting said spindle head relative to said support member, a plurality of spindle assemblies, each of said spindle assemblies including a tool spindle having driven gear means connected thereto, means connecting said spindle assemblies to said spindle head for linear movement relative thereto in opposite directions parallel with the axes of rotation of said tool spindles forming a part thereof, a plurality of driven shafts corresponding in number to said spindle assemblies journaled in said spindle head, each of said shafts being adjacent to one of said spindle assembles and having driving gear means connected thereto and engageable with said driven gear means connected to the tool spindle of the adjacent spindle assembly, and power means operatively connected to said shafts for rotating said shafts and said tool spindles 2. In a machine tool: a support member; a spindle head supported by said support member for movement in opposite directions relative thereto; a plurality of spindle assemblies carried by said spindle head; each of said spindle assemblies including a housing, a rotatable tool spindle in said housing, and a driven gear concentric with and directly connected to said tool spindle; guide means connecting each of said housings to said spindle head for movement in opposite directions relative thereto parallel to the axis of rotation of said tool spindle therein; adjustment means connected between said housings and said spindle head for individually moving said spindle assemblies relative to said spindle head lengthwise of the axis of rotation of said tool spindle forming a part thereof; a plurality of shafts corresponding in number to said spindles journaled for rotation in said spindle head; each of said shafts being adjacent to one of said housings and having a driving gear engageable with said driven gear of the adjacent spindle; and power-actuated means for rotation said shafts and said spindles.

3. In a machine tool as defined in claim 2, and wherein said housings are spaced from each other, are connected to a face of said spindle head, and each have an opening adjacent said face of said spindle head through which said gears are engageable.

4. In a machine tool as defined in claim 3, and wherein each engageable set of gears includes a wide face gear, whereby said housings can be adjustably positioned relative to said head axially of the length of said wide gear while maintaining a driving connection between said gears of each set; and wherein the adjustable movement of said housings exceeds the axial length of said wide face gear of the set driving said tool spindle carried thereby, whereby said housings can be adjusted to positions wherein said sets of gears are engaged and disengaged.

5. In a machine tool, a spindle head, a plurality of spindle assemblies, each of said spindle assemblies including a housing and a tool spindle rotatable within and relative to said housing, said tool spindles having driven gear means connected thereto within said housings, means connecting said tool spindle assemblies to said spindle head for movement of said housings and tool spindles relative to said tool head in opposite directions parallel with the axis of rotation of said tool spindles, said housings being fixed against rotation with said tool spindles, a plurality of shafts corresponding in number to said spindle assembles journaled in said spindle head, each of said shafts being adjacent to one of said spindle assemblies and having driving gear means connected thereto and engageable with said driven gear means connected to the adjacent tool spindle, and power-actuated means operatively connected to said shafts for rotating said shafts and said tool spindles.

6. In a machine tool as claimed in claim 5, wherein said means connecting said spindle assemblies to said spindle head includes means for individually adjusting each spindle assembly relative to said spindle head lengthwise of the axis of rotation of the tool spindle forming a part thereof.

7. In a machine tool as claimed in claim 14, wherein said driven gear means are connected to said tool spindles for movement therewith in said opposite directions, and wherein each engageable set of driven and driving gear means includes a wide face gear, whereby said spindle assemblies can be moved relative to said spindle head while maintaining a driving connection between each engageable set of driving and driven gear means.

8. A machine tool as claimed in claim 5, wherein said housing are connected to a face of said spindle head and are laterally spaced from each other.

9. In a machine tool, a support member, a spindle head, means connecting said spindle head to said support member for linear movement in opposite directions relative thereto, an output shaft having a lower end journaled in an upper portion of said spindle head, a plurality of spindle assemblies carried by said spindle head, each of said spindle assemblies including a housing and a tool spindle rotatable within and relative to said housing below said output shaft, said tool spindles having driven gear means connected thereto within said housings, means connecting said spindle assemblies to said spindle head for movement relative thereto toward and away from said lower end of said output shaft in opposite direction parallel thereto, said housings being fixed against rotation with said tool spindles, a plurality of shafts corresponding in number to said tool spindles journaled in said spindle head adjacent to said tool spindles, gear means connecting the upper ends of said shafts to said lower end of said output shaft, driving gear means connected to said shafts and engageable with said driven gear means connected to said tool spindles, and power-actuated means operatively connected to said output shaft for rotating said shafts and said tool spindles.